(12) United States Patent
Wallis

(10) Patent No.: US 10,383,479 B2
(45) Date of Patent: Aug. 20, 2019

(54) FRICTION ACTIVATED GROUND COFFEE DOSING DISPENSER

(71) Applicant: John Patton Wallis, Elgin, IL (US)

(72) Inventor: John Patton Wallis, Elgin, IL (US)

( * ) Notice: Subject to any disclaimer, the term of this patent is extended or adjusted under 35 U.S.C. 154(b) by 373 days.

(21) Appl. No.: 15/394,342

(22) Filed: Dec. 29, 2016

(65) Prior Publication Data

US 2017/0188755 A1    Jul. 6, 2017

Related U.S. Application Data

(60) Provisional application No. 62/387,668, filed on Jan. 2, 2016.

(51) Int. Cl.
| | |
|---|---|
| *A47J 42/40* | (2006.01) |
| *B65B 1/36* | (2006.01) |
| *B65B 29/02* | (2006.01) |
| *A47J 42/44* | (2006.01) |
| *B65B 1/10* | (2006.01) |
| *A47J 42/50* | (2006.01) |

(52) U.S. Cl.
CPC .............. *A47J 42/40* (2013.01); *A47J 42/44* (2013.01); *A47J 42/50* (2013.01); *B65B 1/10* (2013.01); *B65B 1/36* (2013.01); *B65B 29/022* (2017.08)

(58) Field of Classification Search
CPC . A47J 42/40; A47J 42/50; A47J 42/44; B65B 29/022; B65B 1/10; B65B 1/36

USPC ..... 222/196.2, 199, 200, 425, 287, 344, 351
See application file for complete search history.

(56) References Cited

U.S. PATENT DOCUMENTS

| | | | |
|---|---|---|---|
| 2,077,980 A | 4/1937 | Bell | ................................ 83/18 |
| 4,019,660 A | 4/1977 | Berkey | ........................ 222/434 |
| 5,927,558 A | 7/1999 | Bruce | ........................ 222/185.1 |
| 6,962,274 B1 * | 11/2005 | Sherman | ................ G01F 11/18 |
| | | | 222/344 |
| 8,534,507 B2 | 9/2013 | Gronholm | ..................... 222/368 |
| 9,296,502 B1 | 3/2016 | Hollander | .................. 222/185.1 |
| 2013/0318928 A1 * | 12/2013 | Dakis | .................... A47J 31/404 |
| | | | 53/471 |

FOREIGN PATENT DOCUMENTS

WO    WO-2017091788 A1 *    6/2017    ............ A47J 31/407

* cited by examiner

*Primary Examiner* — Jason K Niesz
(74) *Attorney, Agent, or Firm* — Benjamin D. Rotman; Rosenbaum IP, P.C.

(57) ABSTRACT

A friction active ground coffee dispenser comprising a ground coffee reservoir, a dispensing base and a dispenser. The dispenser may be a rotary dispenser or a slide dispenser. The dispenser further comprises a reservoir that may be scaled to dispense ground coffee into a single serve pod, filter, or other grounds holding devices such as an espresso portafilter.

24 Claims, 11 Drawing Sheets

FRICTION ACTIVATED GROUND COFFEE DOSING DISPENSER

CROSS REFERENCE TO RELATED APPLICATIONS

The present application claims priority from U.S. Provisional Patent Application Ser. No. 62/387,668, filed on Jan. 2, 2016, and is hereby incorporated by reference in its entirety.

BACKGROUND OF THE INVENTION

The present invention relates generally to the dispensing of ground coffee. More particularly, the present invention relates to a friction activated dispenser for ground coffee.

Coffee makers of the prior art utilize a set amount of ground coffee to brew a particular cup or pot. Single serve coffee makers of the prior art utilize pod systems with a set amount of ground coffee within the pod to brew the single cup. Due to environmental and economic concerns, reusable pods were created such that a user could add their own custom ground coffee and not have to settle for the prepacked disposable units. Issues with the reusable pods include getting the perfect amount of grounds into the pod for use with a compatible machine. In the prior art, the user would have to scoop out pre-ground coffee and place it into a filter or reusable pod and try to get the appropriate amount of coffee in the pod without going over and without spilling everywhere. The user would also have issues getting all of the coffee grounds out of a particular container with the scoop based on the shape of the scoop and the shape of the container.

The prior art attempts to remedy the problems created in storing coffee beans and ground coffee to be later dispensed to create the perfect cup of coffee. In the prior art, coffee dispensers stored beans in a reservoir that is mounted on top of a grinder. Gravity would pull the beans down the reservoir into the grinder and when the grinder was activated the device would dispense grounds into a coffee maker, a filter, or an additional reservoir to be used later in time. These devices are efficient for dispensing grounds from beans because the physical characteristics of the beans allow the beans to be funneled through the reservoir into the grinder unburdened.

Ground coffee dispensers in the prior art that use a reservoir to store and dispense pre-ground coffee face added complications due to the granulated nature of the coffee grounds. The granulated nature of the coffee grounds causes the coffee grounds to clump together and prevents the smooth flow of grounds outside of the reservoir. Prior art inventions have attempted to remedy this issue by adding stirs or tampers to break up the clumps to promote flow of the ground coffee.

The present invention addresses the issue of flow of granulated grounds out of a reservoir by friction activating the ground coffee. The invention also provides for a coffee ground dispenser with the ability to dispense a pre-measured amount of coffee grounds into a reusable pod, coffee filter, espresso portafilter or similar receptacle.

SUMMARY OF THE INVENTION

In view of the above, a friction activated coffee ground dispenser configured to dispense pre-measured amounts of ground coffee into a reusable pod, coffee filter, espresso portafilter or similar receptacle is disclosed. The advantage of the present invention is that it allows ground coffee to be dispensed with convenience and little mess. Another advantage of the present invention is that it allows all of the grounds to flow out of the reservoir and be used to brew a cup of coffee; ground coffee does not get stuck in hard to reach can seams or in containers too shallow to scoop.

In one example embodiment of the present invention, the friction activated ground coffee dispenser comprises a conically-tapered ground coffee reservoir coupled to a dispensing base. The dispensing base further comprises a dispenser having a dispenser reservoir to receive and dispense ground coffee. In one aspect of the invention the dispenser is a rotary dispenser configured to have a first rotated state in which an opening on the dispenser reservoir faces an opening at the bottom of the ground coffee reservoir and a second rotated state in which the dispenser reservoir is rotated 180 degrees to dispense the ground coffee into a receptacle. In some embodiments, a handle is used to rotate the rotary dispenser, while in other embodiments an automated or powered rotary mechanism is used to rotate the rotary dispenser. In some embodiments, the dispenser is coupled to the dispensing base such that at least a portion of the dispenser is immersed within the ground coffee reservoir. In these embodiments, a tapered base of the ground coffee reservoir comprises a tapering angle and a central longitudinal axis of the dispenser base is positioned within the vertex of the tapering angle. The positioning of the dispenser within the projected vertex allows for the dispenser to apply frictional forces to the ground coffee in a static state due to gravity acting on the grounds onto the surface of the dispenser as well as in a dynamic state when the dispenser is rotated between states and the surface of the dispenser acts to agitate and activate the ground coffee. The frictional forces on the ground coffee generated by gravity and the rotation of the rotary dispenser during a transition from the first rotated state to the second rotated state activates the coffee grounds and causes the coffee grounds to flow down the tapered reservoir into the dispenser reservoir.

In other embodiments, the dispenser is a sliding or translating dispenser configured to have a first translated state and a second translated state. In the first translated state, a top opening of the slide dispenser reservoir faces the bottom opening of the ground coffee reservoir and a second opening at the bottom of the slide dispenser is bound by the dispensing base. In the second slide state, the slide dispenser is translated away from the base exposing the second opening to a dispensing opening on the dispensing base and allowing the coffee grounds to be dispensed into a receptacle. In some embodiments, a handle is used to manually move the slide dispenser between states, while in other embodiments an automated or powered sliding mechanism is used to slide or translate the slide dispenser. The frictional forces on the ground coffee generated by the translation motion of the translation dispenser during a transition from the first translated state to the second translated state activates the coffee grounds and causes the coffee grounds to flow down the tapered reservoir into the dispenser reservoir.

In some embodiments, the dispensing reservoir is configured to be scalable or adjustable such that the ground coffee dosing size dispensed can be adapted for a particular filter or reusable pod. The dispensing reservoir size may be scaled by adding or removing different sized dispensing reservoir inserts into the dispenser or adjusting the wall size of the dispensing reservoir.

In some embodiments, the coffee grounds reservoir further comprises multiple chambers configured to dispense from at least one chamber at a time. In this embodiment, multiple types of ground coffee may be dispensed from respective chambers.

In some embodiments, the dispenser base further comprises a means to fix or secure the ground coffee dispenser to a counter or table. The means may include but is not limited to suction cups.

Another aspect of the invention includes a method of dispensing ground coffee including the steps of loading coffee grounds into a conically tapered reservoir coupled to a dispensing base comprising a dispenser. The method further includes activating the coffee grounds into a dispenser reservoir by actuating the dispenser. The method additionally includes the steps of moving the dispenser from a first receiving state to a second dispensing state. Finally the method includes the step of dispensing the ground coffee into a receptacle.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1A:
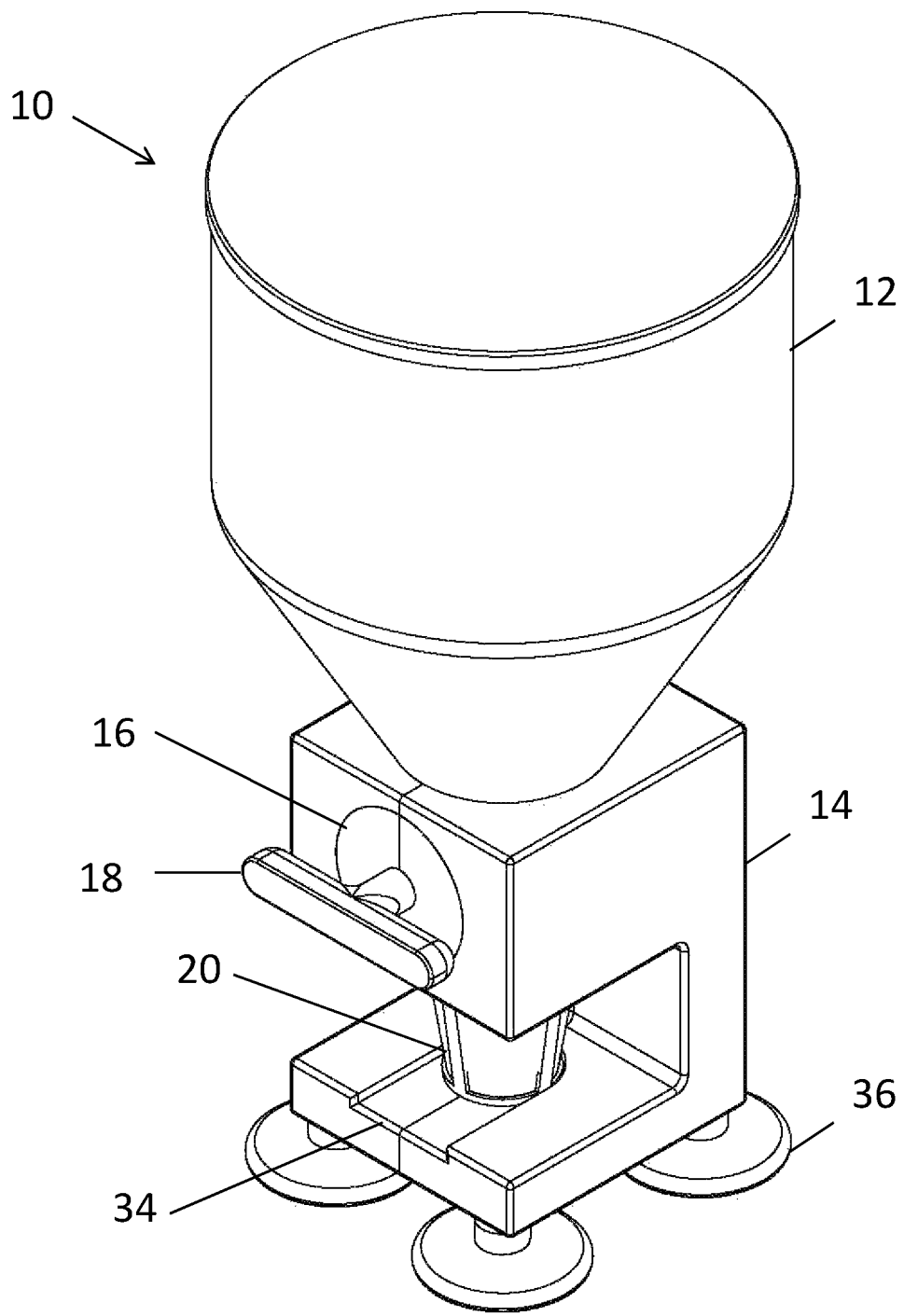
FIG. 1A represents a perspective view of an embodiment of the invention.
Figure 1B:
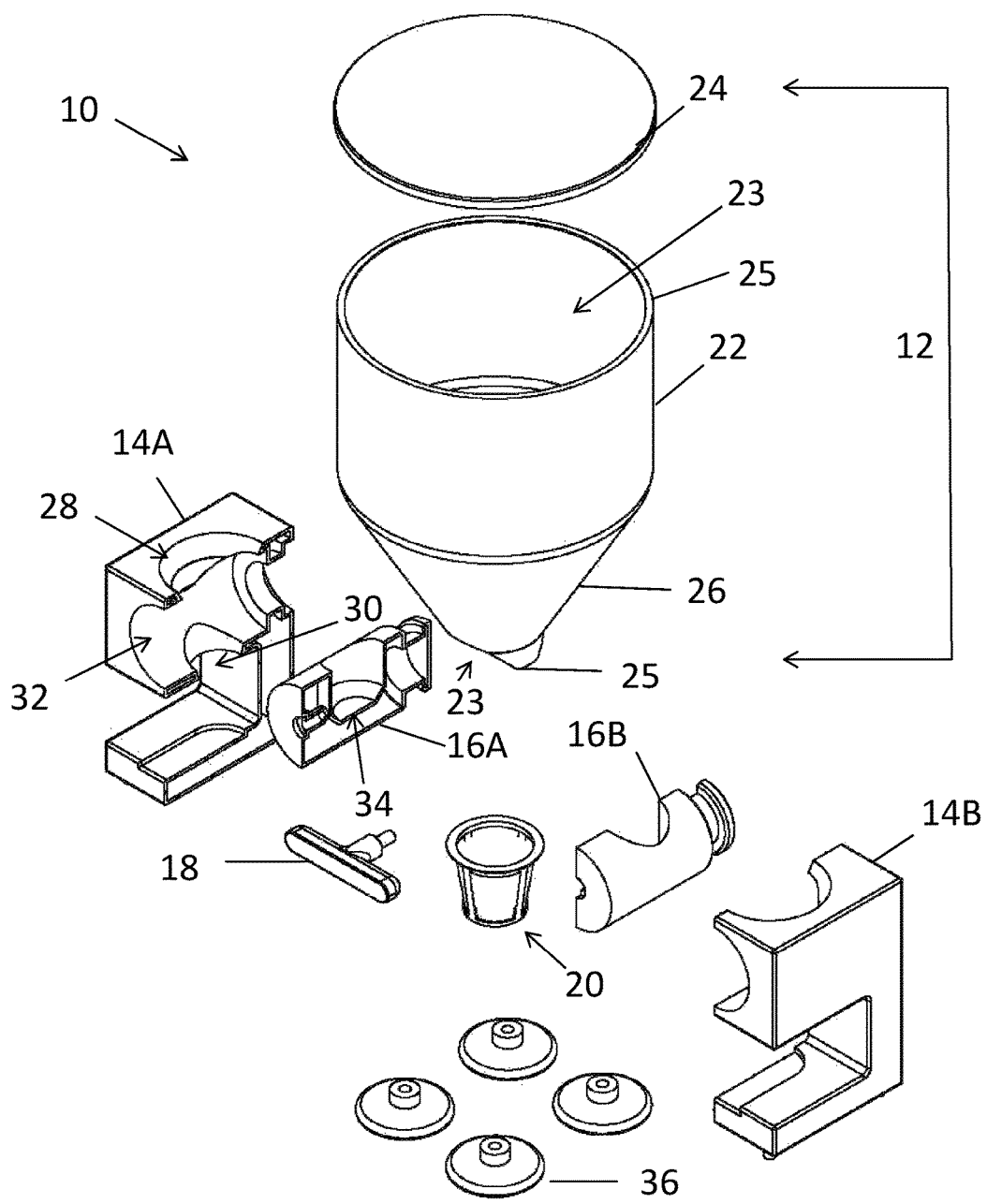
FIG. 1B represents an exploded perspective view of an embodiment of the invention.
Figure 4A:
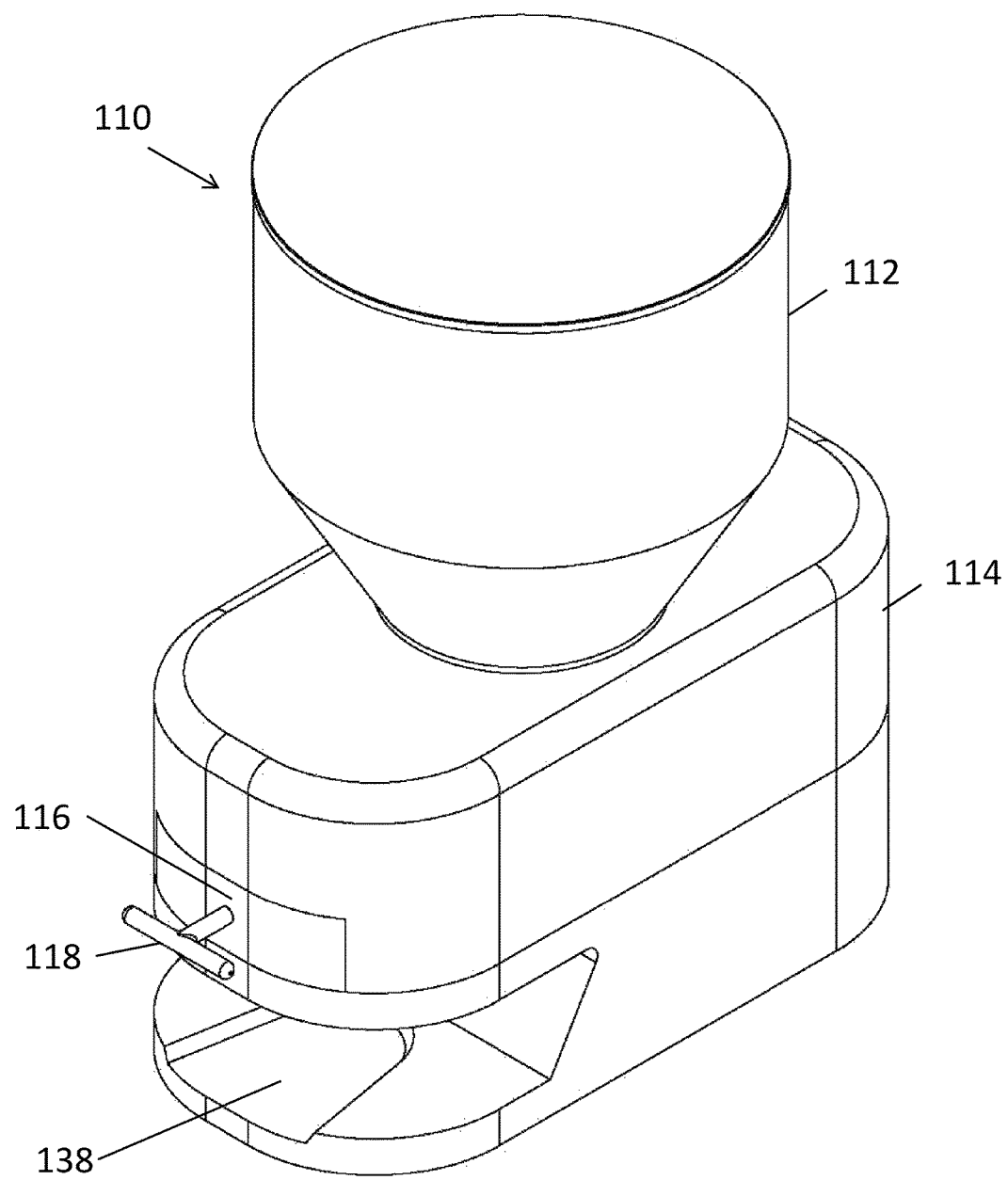
FIG. 4A represents a perspective view of an alternate embodiment of the invention.
Figure 4B:
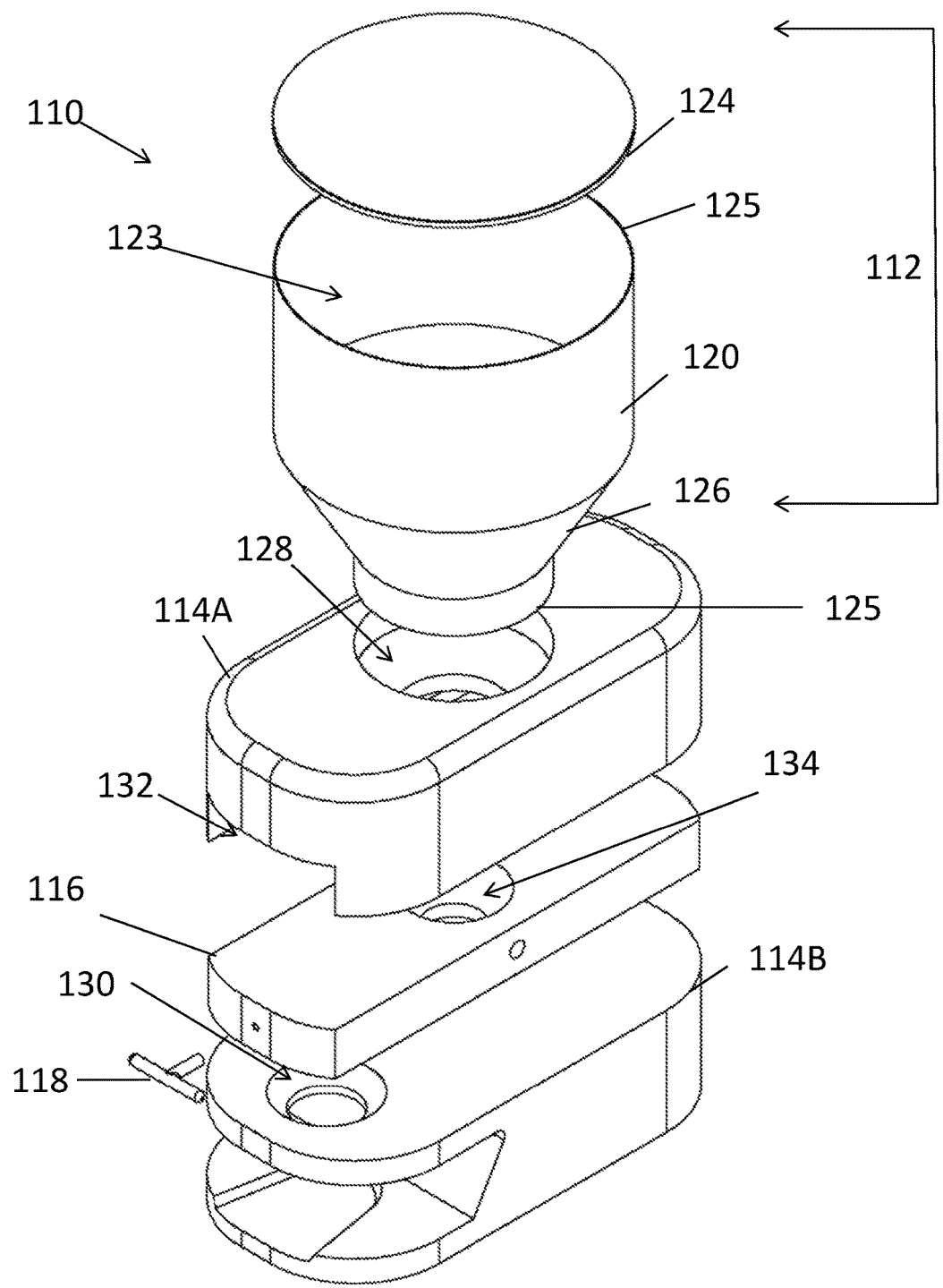
FIG. 4B represents an exploded perspective view of an alternate embodiment of the invention.

FIGS. 1A and 4A are perspective views of two friction activated ground coffee dispenser system embodiments 10, 110. The embodiments exemplified by FIGS. 1A and 4A comprise a ground coffee reservoir 12, 112, a dispensing base 14, 114, a dispenser 16, 116, a dispenser handle 18, 118, and a ground coffee receptacle 20, 120. FIGS. 1B and 4B represent exploded views of FIGS. 1A and 4A and embodiments 10 and 110 respectively detailing the component parts of example embodiments.

As constructed in FIGS. 1A and 1B, the ground coffee reservoir 12 comprises a hollow cylinder 22 having an opening 23 on a top end 25 covered with a lid 24 and a conically tapered base 26 leading to an opening 27 on a bottom end 29. In the present embodiment, as shown in the cross-sectional views of FIGS. 3B and 3C, the conical tapering is at about a 60 degree angle to provide for the smoothest granular flow of the ground coffee from the ground coffee reservoir 12 into the dispensing base 14. In other embodiments, the shape of the reservoir 12 may include, but not be limited to, any hollow prismatic shape with a tapered base 26 tapering to an opening.

Figure 6A:
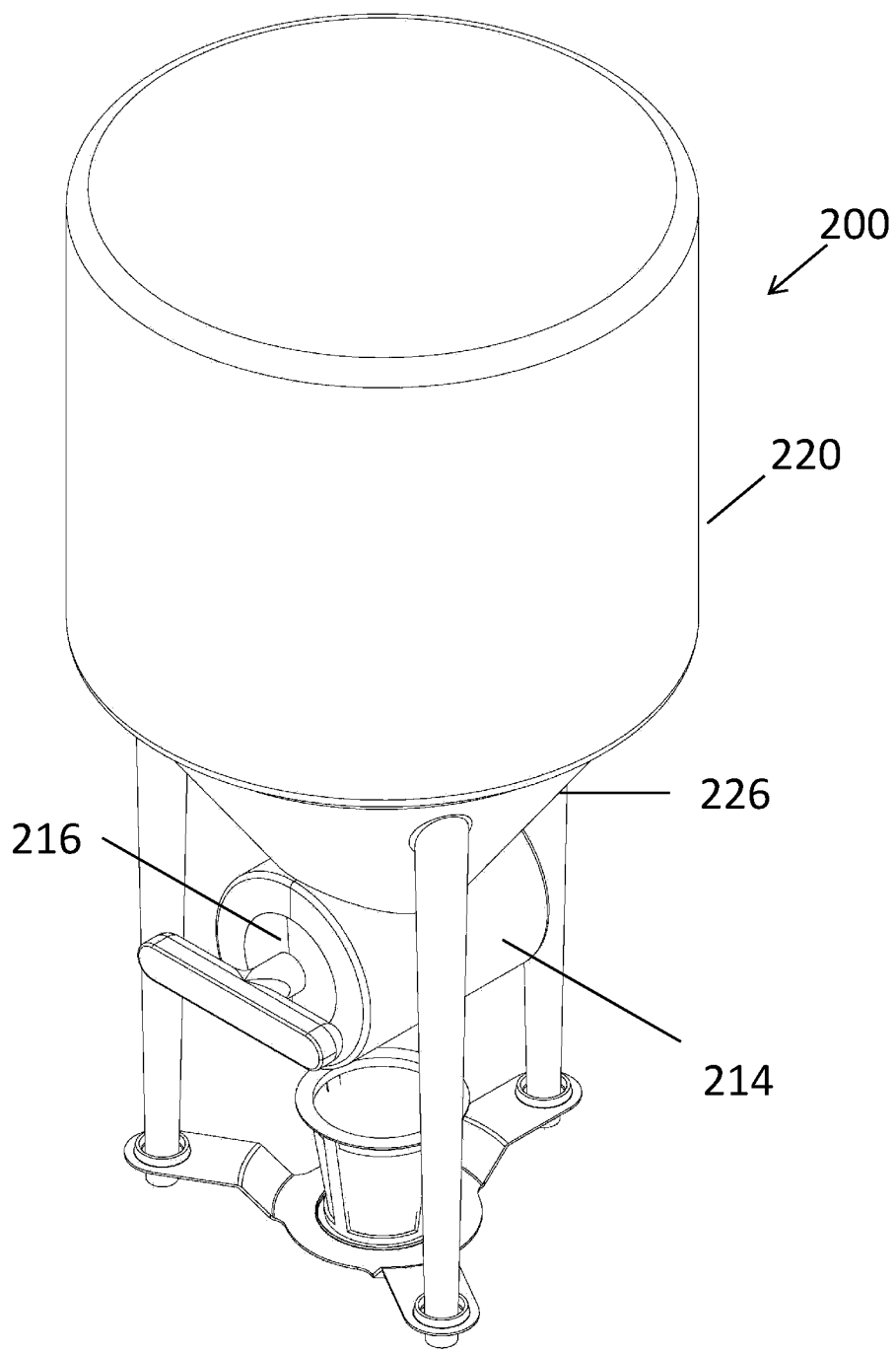
FIG. 6A represents a perspective view of an alternate embodiment of the invention.
Figure 6B:
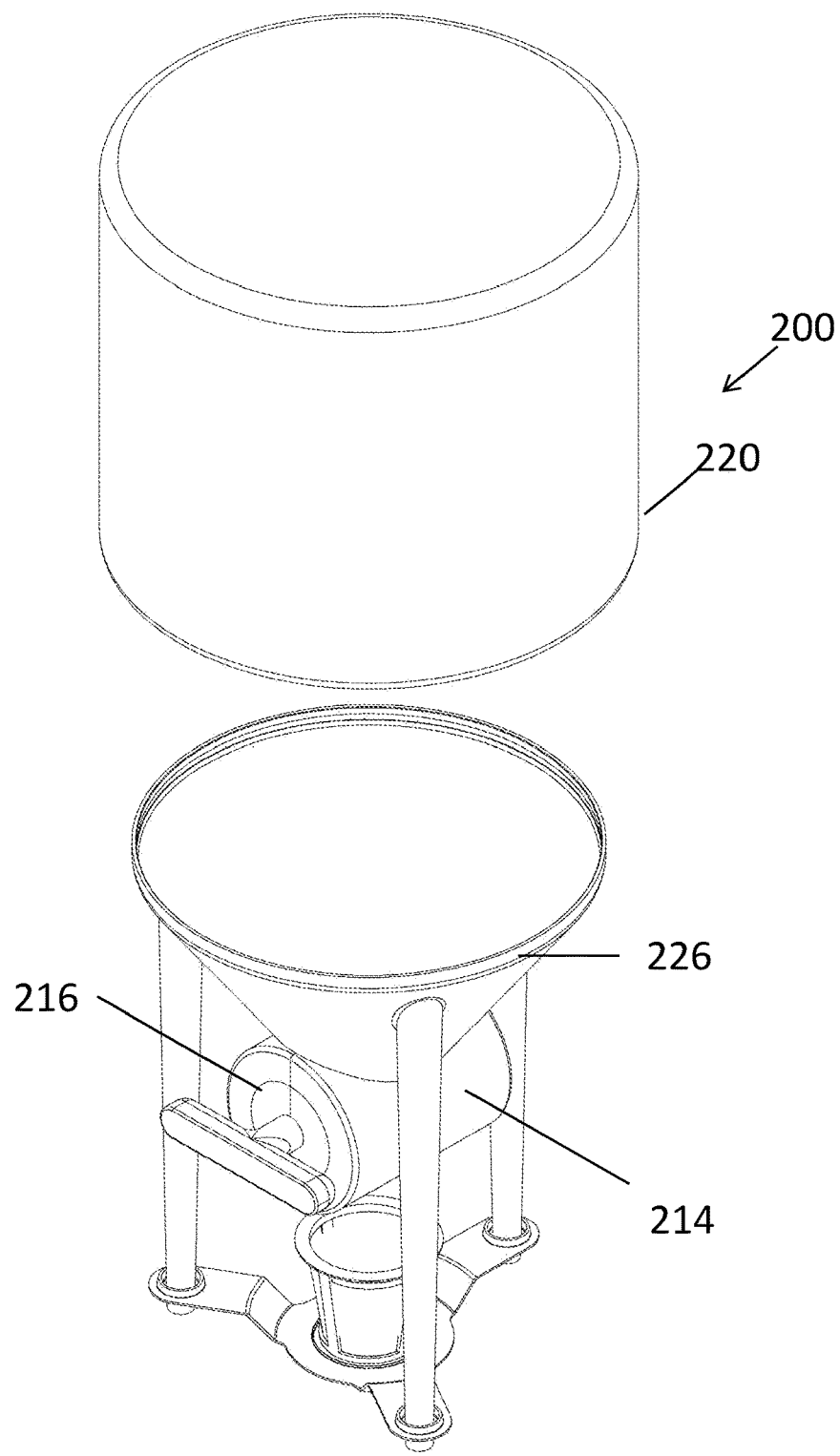
FIG. 6B represents an exploded perspective view of an alternate embodiment of the invention.

In some embodiments as shown in FIGS. 6A and 6B, the ground coffee reservoir 220 of the friction activated ground coffee dispenser 200 may be a coffee can that is further coupled to the tapered base 226 such that the base acts to funnel the ground coffee from the can into the dispensing base 214. In this embodiment when the can 220 is empty, the can 220 is removed from the tapered base 226 and either refilled or replaced with a new can. In this embodiment the coupling between the can 220 and the tapered base 226 may be configured to form an airtight seal to retain the freshness of the ground coffee.

In other embodiments, the ground coffee reservoir 12 may be divided up into at least two chambers. In this configuration, the ground coffee reservoir 12 is configured to be able to dispense different varieties of ground coffee or different grind size coffee depending on the brewing application. Further in this configuration, each chamber may have a tapered base portion and access to the open end of the base as well as an insert that acts to close off the opening of that particular chamber. In other configurations, instead of an insert that acts to close off the opening, a receiving opening 28 in the dispensing base 14 may be configured to be the size of only one chamber opening, and as the ground coffee reservoir 12 rotates about an axis of the receiving opening 28 an open chamber is exposed to the receiving opening 28.

In the embodiment of FIG. 1A, ground coffee reservoir 12 is coupled to the dispensing base 14. The ground coffee reservoir 12 may be coupled to the dispensing base 14 by non-limiting examples including complimentary threading feature on the ground coffee reservoir 12 and the dispensing base 14, a compression fit between the ground coffee reservoir 12 and the dispensing base 14, adhesive, glue, or epoxy between the ground coffee reservoir 12 and the dispensing base 14, heat staking between the ground coffee reservoir 12 and the dispensing base 14, a magnetic engagement between the ground coffee reservoir 12 and the dispensing base 14, or a snap fit between the ground coffee reservoir 12 and the dispensing base 14.

In the embodiment of FIGS. 1A and 1B, the dispensing base 14 comprises a receiving opening 28, a dispensing opening 30, a dispenser cavity 32, and a receptacle base 34. The dispenser cavity 32 is configured to house the dispenser 16. The dispenser 16 is coupled to the dispensing base such that it is free to rotate about a longitudinal axis of the dispenser cavity 32 but constrained from translating along the longitudinal axis of the dispenser cavity 32. Additional aspects of the dispensing base 14 may include a securing device such as suction cups 36 coupled to the bottom of the dispensing base 14 configured to secure the coffee grounds dispenser 10 to a flat surface and help prevent toppling of the device 10. In some embodiments, the dispensing base 14 may be multiple pieces joined together 14A and 14B configured to couple around the dispenser 16, while in other embodiments the dispensing base 14 may be a single formed, molded, or machined piece wherein the dispenser is configured to be confined by features such as snaps or fasteners.

Figure 2A:
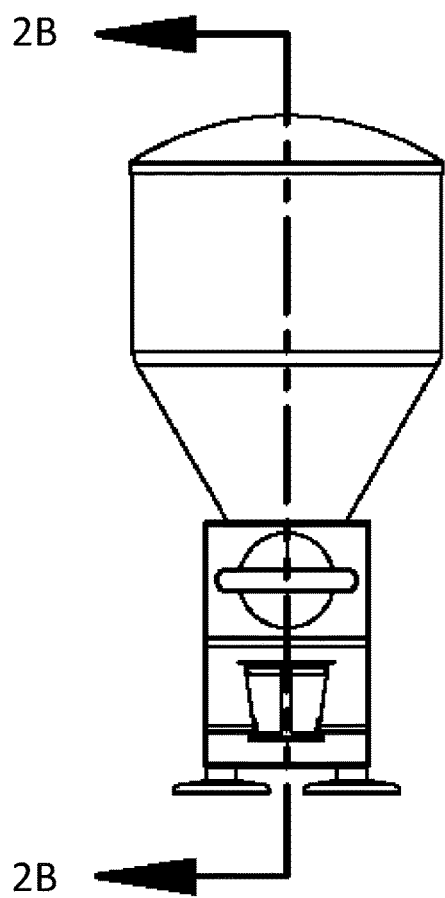
FIG. 2A represents a front view of an embodiment of the invention.
Figure 2B:
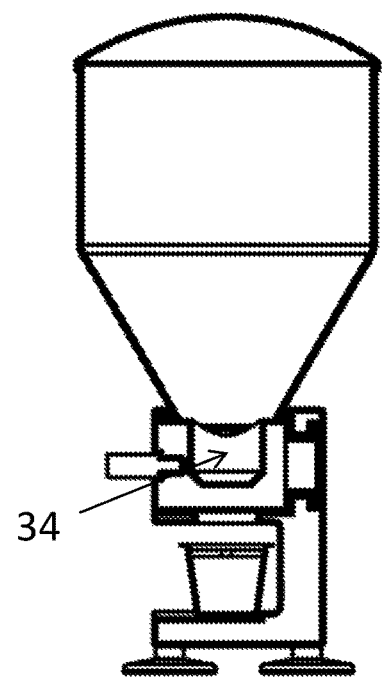
FIG. 2B represents a cross-section view of the embodiment of FIG. 2A with the dispenser in a receiving state.
Figure 2C:
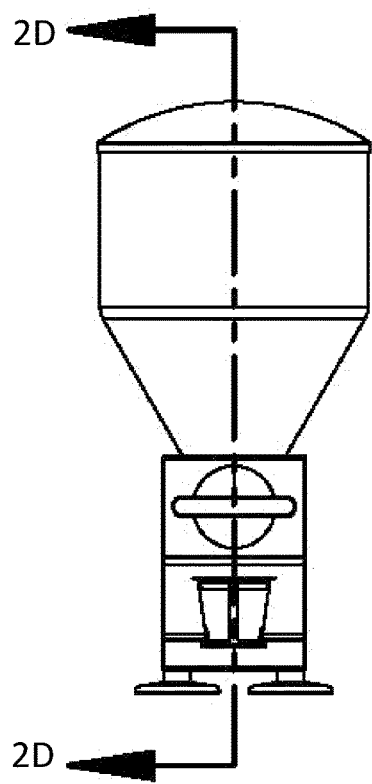
FIG. 2C represents a front view of an embodiment of the invention.
Figure 2D:
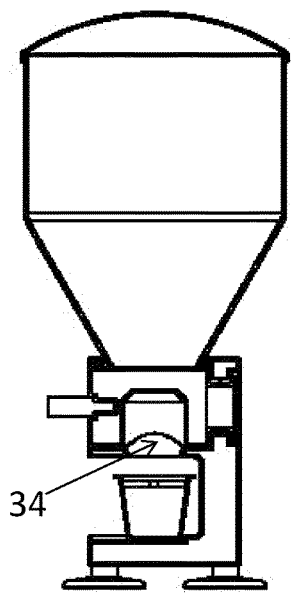
FIG. 2D represents a cross-section view of the embodiment of FIG. 2C with the dispenser in a dispensing state.

As shown in cross-sectional views of FIGS. 2B and 2D, the dispenser 16 comprises dispenser reservoir 34 configured to align to a top opening with the receiving opening 28 in one rotational state, and the dispensing opening 30 in a second rotational state. The dispenser 16 may be rotated by the use of the dispenser handle 18 or similar mechanical rotational means. The rotation of the dispenser 16 causes frictional forces to act upon the ground coffee and force movement as well as breakup any clumped together grains. This friction activation creates a smooth flow of ground coffee out of the ground coffee reservoir 12 and into the dispensing reservoir 34.

Figure 3A:
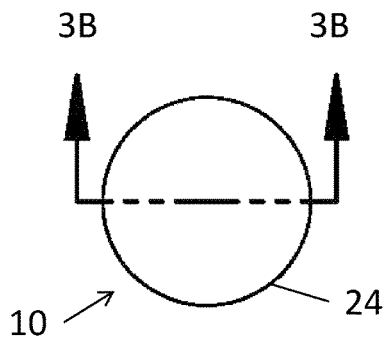
FIG. 3A represents a top view of an embodiment of the invention.
Figure 3B:
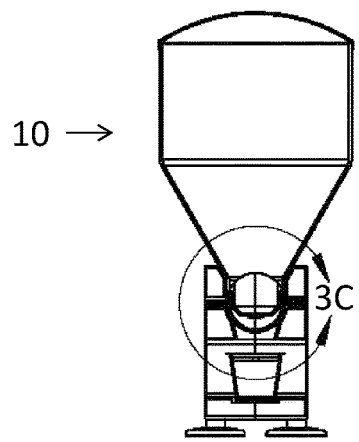
FIG. 3B represents a cross-section view of the embodiment of FIG. 3A with the dispenser in a receiving state.
Figure 3C:
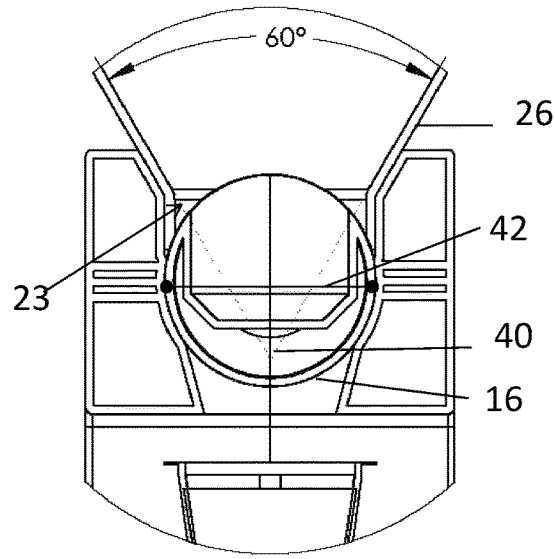
FIG. 3C represents a detailed view of the embodiment of FIG. 3B with the dispenser in a receiving state.

In some embodiments as shown in cross-sectional views of FIGS. 3B and 3C, in order to aid the flow of ground coffee, the dispenser 16 is coupled to the dispensing base 14 such that at least a portion of the dispenser 16 is immersed with the ground coffee reservoir 12. In this embodiment, the tapered base 26 comprises a tapering angle and a central longitudinal axis 38 of the dispenser base 32 is positioned within the vertex of the tapering angle. Increased ground coffee flow efficiency has been found in some embodiments where the dispenser 16 is coupled to the dispensing base 14 such that a longitudinal rotational axis 38 of the dispenser cavity 32 is positioned within the projected vertex 40 of the tapering angle and at a distance of at least 25% of the outside diameter 42 of the dispenser. To provide additional aid in ground coffee flow and friction activation, the outer surface of the dispenser 16 may comprise a texture or non-smooth pattern on at least a portion of the outer surface that makes direct contact with the ground coffee.

In use, ground coffee placed within the ground coffee reservoir 12, is in direct contact with the dispenser 16. This is accomplished by providing an opening on the bottom end of the ground coffee reservoir 12 that is directly exposed to dispenser 16. When the dispenser is rotated, the rotation causes frictional forces created by the outside surface of the dispenser against ground coffee that is in direct contact therewith. This acts as an agitation of the ground coffee. The frictional forces therefor act to breakup any clumping of the ground coffee and provides a smooth flow of ground coffee into the dispensing reservoir 34.

The dispenser reservoir 34 may vary in size depending on the dispensing application to accommodate multiple ground coffee dosing sizes. By way of non-limiting example, the dispenser reservoir 34 may be the size to accommodate a reusable coffee pod for a single serve machine, it may be the size to fill a multiple cup filter, or even for a shot of espresso to fill a portafilter. In some embodiments, the size of dispenser reservoir 34 is adjustable by adding or removing inserts. In other embodiments, the size of dispenser reservoir 34 is adjustable by having a movable interior walls that are configured to lock into various positions within the dispenser reservoir 34 to set its size. Embodiments with adjustable reservoirs may also have coinciding adjustable dispensing bases 14 that allow for similar adjustment of the dispensing opening 30 to accommodate the change in size of the dispenser reservoir 34.

In some embodiments, as shown in FIG. 1B, the dispenser 16 may be multiple pieces joined together 16A, 16B, while in other embodiments the dispenser 16 may be a single formed, molded, or machined piece wherein the dispenser 16 is configured to be confined by features including, but not limited to, snaps or fasteners within the dispensing base 14.

A method of operating the coffee grounds dispenser 10 as shown in FIGS. 1A-3C includes the steps of removing the lid 24 of the ground coffee reservoir 12, filling the ground coffee reservoir 12 with ground coffee, friction activating the ground coffee by rotating the dispenser 16 within the dispensing base 14 such that an opening of the dispenser reservoir 34 faces the receiving opening 28 of the dispensing base 14, filling the dispenser reservoir 34 with ground coffee, rotating the dispenser 16 such that an opening of the dispenser reservoir 34 faces the dispensing opening 30 of the dispensing base 14, dispensing the ground coffee into a receptacle 20. Additional steps in some embodiments may include adjusting the size of the dispensing reservoir 34 by adjusting the internal wall placement of the dispensing reservoir 34 or adding or removing an insert to the dispensing reservoir 34. In some embodiments, the step of adding ground coffee may include coupling or replacing a coffee can to a tapered reservoir base 26.

FIGS. 4A and 4B detail an additional embodiment of the friction activated ground coffee dispenser 110. The ground coffee reservoir 112 comprises a hollow cylinder 122 having an opening 123 on a top end 125 covered with a lid 124 and a conically tapered base 126 leading to an opening 127 on a bottom end 129. In the present embodiment, as shown in the cross-sectional views of FIGS. 5B and 5C, the conical tapering is about 60 degrees to provide for the smoothest granular flow of the coffee grounds from the ground coffee reservoir 112 into the dispensing base 114. In other embodiments, the shape of the reservoir 112 may include, but not be limited to, any hollow prismatic shape with base 126 tapering to an opening.

In the embodiment of FIG. 4A, the ground coffee reservoir 112 is coupled to the dispensing base 114. The ground coffee reservoir 112 may take the form of any of additional embodiments described above. The ground coffee reservoir 112 may be coupled to the dispensing base 114 by non-limiting examples including complimentary threading features on the ground coffee reservoir 112 and the dispensing base 114, a compression fit between the ground coffee reservoir 112 and the dispensing base 114, adhesive, glue, or epoxy between the ground coffee reservoir 112 and the dispensing base 114, heat staking between the ground coffee reservoir 112 and the dispensing base 114, a magnetic engagement between the ground coffee reservoir 112 and the dispensing base 114, or a snap fit between the ground coffee reservoir 112 and the dispensing base 114.

In the embodiment of FIGS. 4A and 4B, the dispensing base 114 comprises a receiving opening 128, a dispensing opening 130, a dispenser cavity 132, and a receptacle base 138. The dispenser cavity 132 is configured to house the dispenser 116. The dispenser 116 is coupled to the dispensing base such that it may slide or translate along a longitudinal axis of the dispenser cavity 132 but is constrained from rotating about the longitudinal axis of the dispenser cavity 132. Additional aspects of the dispensing base 114 may include a securing device such a suction cups 136 coupled to the bottom of the dispensing base 114 configured to secure the coffee grounds dispenser 110 to a flat surface and help prevent toppling of the device 110. In some embodiments, the dispensing base 114 may be multiple pieces joined together 114A and 114B configured to couple together and around the dispenser 116, while in other embodiments, the dispensing base 114 may be a single formed, molded, or machined piece wherein the dispenser is configured to be confined by features such the non-limiting examples of snaps, fasteners, or detents.

Figure 5A:
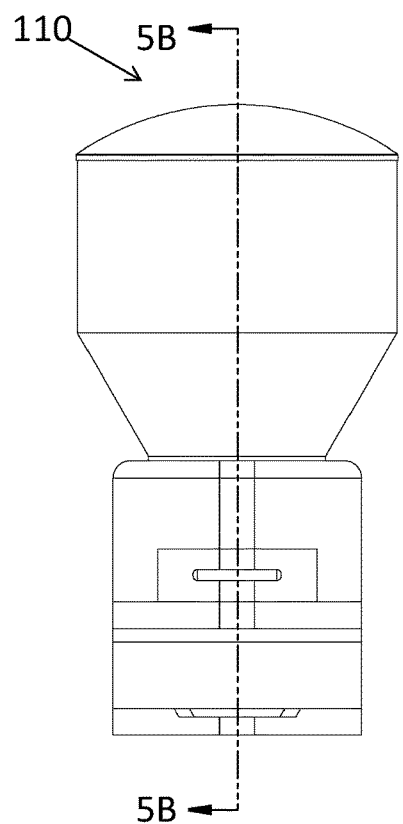
FIG. 5A represents a front view of FIG. 4.
Figure 5B:
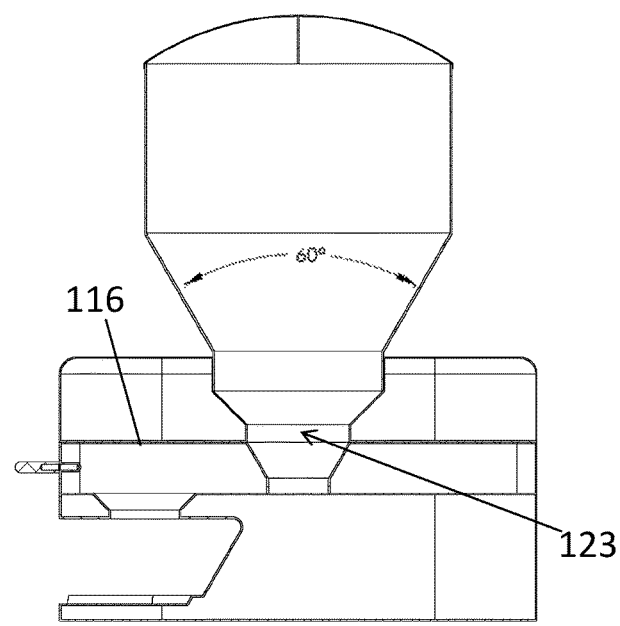
FIG. 5B represents a cross-section view of the embodiment of FIG. 5A with the dispenser in a receiving state.
Figure 5C:
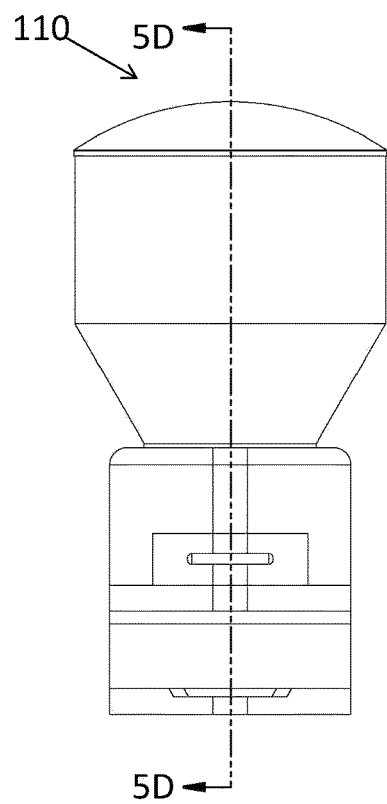
FIG. 5C represents a front view of an embodiment with the dispenser in a dispensing state.
Figure 5D:
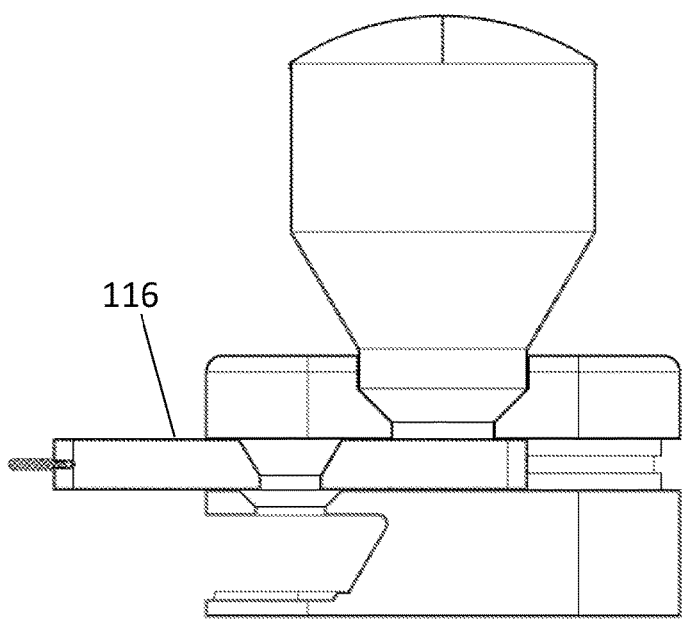
FIG. 5D represents a cross-section view of the embodiment of FIG. 5C with the dispenser in a dispensing state.

As shown in cross-sectional views of FIGS. 5B and 5D, the dispenser 116 comprises dispenser reservoir 134 having a top opening configured to align to the receiving opening 128 in one translated state, and a bottom opening configured to align to the dispensing opening 130 in a second translated state. The top opening and the receiving opening 128 may be large enough to facilitate gravity to effect flow of the granulated coffee. The dispenser 116 may be translated by the use of the dispenser handle 118 or similar mechanical mechanism configured to move the dispenser 116 along the longitudinal axis. The sliding movement or translation of the dispenser 116 causes frictional forces to act upon the ground coffee in the coffee grounds reservoir 112 and force movement of the ground coffee as well as breakup any clumped together grains. This friction activation creates a smooth flow of ground coffee out of the ground coffee reservoir 112 and into the dispensing reservoir 134. In order to aid in ground coffee flow and provide additional friction, the top surface of the dispenser 116 may be configured to have a surface texture or non-smooth pattern.

As indicated in similar embodiments, the dispenser reservoir 134 may vary in size depending on the dispensing application. By way of non-limiting example, the dispenser reservoir 134 may be the size to accommodate a reusable coffee pod for a single serve machine, it may be the size to fill a multiple cup filter, or even for a shot of espresso to fill a portafilter. In some embodiments the size of dispenser reservoir 134 is adjustable by adding and removing inserts. In other embodiments, the size of dispenser reservoir 134 is adjustable by having a movable interior walls that are configured to lock into various positions within the dispenser reservoir 134 to set its size. Embodiments with adjustable reservoirs may also have coinciding adjustable dispensing bases 114 that allow for similar adjustment of the dispensing opening 130 to accommodate the change in size of the dispenser reservoir 134.

A method of operating the coffee grounds dispenser 110 as shown in FIGS. 4A-5C includes the steps of removing the lid 124 of the ground coffee reservoir 12, filling the ground coffee reservoir 112 with ground coffee, friction activating the ground coffee by translating the dispenser 116 within the a dispensing base 114 such that the top opening of the dispenser reservoir 114 of the dispenser 116 faces the receiving opening 128 of the dispensing base 114, filling the dispenser reservoir 134 with ground coffee, translating the dispenser 116 such that the bottom opening of the dispenser reservoir 134 faces the dispensing opening 130 of the dispensing base 114, dispensing the ground coffee into a receptacle 120. Additional steps in some embodiments may include adjusting the size of the dispensing reservoir 134 by adjusting the internal wall placement of the dispensing reservoir 134 or adding or removing an insert to the dispensing reservoir 134. In some embodiments, the step of adding ground coffee may include coupling or replacing a coffee can to a tapered reservoir base 126.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A friction activated ground coffee dispenser comprising:
   a ground coffee reservoir having a tapered base and an opening positioned on a bottom end defined therein;
   a dispensing base coupled about the opening on the bottom end of the ground coffee reservoir, the dispensing base having a receiving opening in direct communication with the opening on the bottom end of the ground coffee reservoir, a dispensing opening, and a dispenser cavity having a central longitudinal axis;
   a dispenser rotationally coupled about the central longitudinal axis within the dispenser cavity of the dispensing base, the dispenser having a non-smooth external surface partially and directly exposed within the opening on the bottom end of the ground coffee reservoir, the dispenser further having a dispenser reservoir wherein an opening of the dispenser reservoir is aligned with the receiving opening in a first state to allow ground coffee into the reservoir and the opening of the dispenser reservoir is aligned with the dispensing opening in a second state to allow ground coffee in the reservoir to dispense out of the ground coffee dispenser; and
   the dispenser, when rotated, is configured to create frictional forces on ground coffee within the ground coffee reservoir upon a rotation of the dispenser and contact between the external surface of the dispenser and the ground coffee adjacent the opening on the bottom end of the ground coffee reservoir defined by a transition between the first state and the second state.

2. The friction activated ground coffee dispenser of claim 1 wherein the tapered base is tapered at a tapering angle and the central longitudinal axis of the dispenser cavity is positioned within a vertex formed by the tapering angle.

3. The friction activated ground coffee dispenser of claim 2 wherein the central longitudinal axis of the dispenser cavity is positioned above the vertex by a distance of at least 25% of an outer diameter of the dispenser.

4. The friction activated ground coffee dispenser of claim 3 wherein the tapering angle is about 60 degrees combined angle.

5. A friction activated ground coffee dispenser comprising:

a ground coffee reservoir having an opening positioned on a bottom end defined therein;

a dispensing base coupled about the opening on the bottom end of the ground coffee reservoir, the dispensing base having a receiving opening in direct communication with the opening on the bottom end of the ground coffee reservoir, a dispensing opening, and a dispenser cavity;

a dispenser within the dispenser cavity of the dispensing base, the dispenser having a non-smooth external surface partially and directly exposed within the opening on the bottom end of the ground coffee reservoir, the dispenser further having a dispenser reservoir wherein an opening of the dispenser reservoir is aligned with the receiving opening in a first state to allow ground coffee into the reservoir and the opening of the dispenser reservoir is aligned with the dispensing opening in a second state to allow ground coffee in the reservoir to dispense out of the ground coffee dispenser; and the dispenser is configured to create frictional forces on ground coffee within the ground coffee reservoir upon a transition between the first state and second state and contact between the external surface of the dispenser and the ground coffee adjacent the opening on the bottom end of the ground coffee reservoir.

6. The friction activated ground coffee dispenser of claim 5 wherein the dispenser is further configured to dispense ground coffee through the dispensing opening into a receptacle.

7. The friction activated ground coffee dispenser of claim 6 wherein the receptacle is a single serve coffee pod, a coffee filter, or an espresso portafilter.

8. The friction activated ground coffee dispenser of claim 5 wherein the dispenser is configured to rotate about a longitudinal axis of the dispenser cavity such that in a first rotational state the opening on the dispenser reservoir faces the receiving opening and is configured to receive ground coffee and in second rotational state such that the opening on the dispenser reservoir faces the dispensing opening and is configured to dispense ground coffee through the dispensing opening.

9. The friction activated ground coffee dispenser of claim 5 wherein the dispenser is configured to translate along a longitudinal axis of the dispenser cavity such that in a first translated state a top opening on the dispenser reservoir faces the receiving opening and is configured to receive ground coffee and in second translated state a bottom opening on the dispenser reservoir faces the dispensing opening and is configured to dispense ground coffee through the dispensing opening.

10. The friction activated ground coffee dispenser of claim 5 wherein the dispenser reservoir is configured to be adjustable to accommodate multiple ground coffee dosing sizes.

11. The friction activated ground coffee dispenser of claim 10 wherein the dispensing opening is adjustable to accommodate the dispenser reservoir.

12. The friction activated ground coffee dispenser of claim 5 wherein the dispensing base further comprises suction cups configured to secure the friction activated ground coffee dispenser to a surface.

13. The friction activated ground coffee dispenser of claim 5 wherein the dispenser further comprises a handle configured to transition the dispenser between the first state and the second state.

14. The friction activated ground coffee dispenser of claim 5 wherein the coffee ground reservoir further comprises a tapered base.

15. The friction activated ground coffee dispenser of claim 14 wherein the tapered base tapers at a 60 degree angle.

16. The friction activated ground coffee dispenser of claim 5 wherein the ground coffee reservoir comprises a coffee can coupled to the tapered base.

17. The friction activated ground coffee dispenser of claim 5 wherein the ground coffee reservoir comprises at least two chambers configured to separate ground coffee, each chamber having an opening at a bottom of the tapered base.

18. The friction activated ground coffee dispenser of claim 17 wherein the ground coffee reservoir further comprises inserts configured to close off a bottom opening of at least one of the at least two chambers.

19. The friction activated ground coffee dispenser of claim 17 wherein the receiving opening is configured to align to at least one of the at least two chambers and the ground coffee reservoir is configured to rotate about an axis of the receiving opening.

20. A method for dispensing ground coffee using a friction activated ground coffee dispenser comprising the steps of:

filling a ground coffee reservoir with ground coffee wherein the ground coffee reservoir is coupled to a dispensing base having a receiving opening, a dispensing opening, a dispensing cavity, and a dispenser having a non-smooth external surface and a dispenser reservoir coupled within the dispensing cavity;

friction activating the ground coffee by agitating the ground coffee with the non-smooth external surface of the dispenser while aligning an opening of the dispenser reservoir with the receiving opening of the dispensing base;

filling the dispenser reservoir with ground coffee;

aligning an opening of the dispenser reservoir with the dispensing opening of the dispensing base; and dispensing the ground coffee out of the dispenser reservoir through the dispensing opening.

21. The method for dispensing ground coffee using a friction activated ground coffee dispenser of claim 20 wherein the step of dispensing the ground coffee out of the dispenser reservoir through the dispensing opening further includes dispensing the ground coffee into a receptacle including a single serve coffee pod, a coffee filter, or an espresso portafilter.

22. The method for dispensing ground coffee using a friction activated ground coffee dispenser of claim 20 wherein the step of friction activating the ground coffee further includes the step of rotating the dispenser about a longitudinal axis of the dispenser cavity causing frictional forces to act upon the ground coffee with the ground coffee reservoir, and wherein the step of aligning an opening of the dispenser reservoir with the dispensing opening further includes rotating the dispenser about the longitudinal axis of the dispenser cavity from alignment with the receiving opening to alignment with the dispensing opening.

23. The method for dispensing ground coffee using a friction activated ground coffee dispenser of claim 20 wherein the step of friction activating the ground coffee further includes the step of translating the dispenser along a longitudinal axis of the dispenser cavity causing frictional forces to act upon the ground coffee with the ground coffee reservoir, and wherein the step of aligning an opening of the dispenser reservoir with the dispensing opening further includes translating the dispenser along the longitudinal axis of the dispenser cavity from alignment with the receiving opening to alignment with the dispensing opening.

24. The method for dispensing ground coffee using a friction activated ground coffee dispenser of claim 20 wherein the ground coffee reservoir comprising a coffee can coupled to a tapered base further wherein the step of filling a ground coffee reservoir includes coupling a filled coffee can to the tapered base.

* * * * *